2,873,984

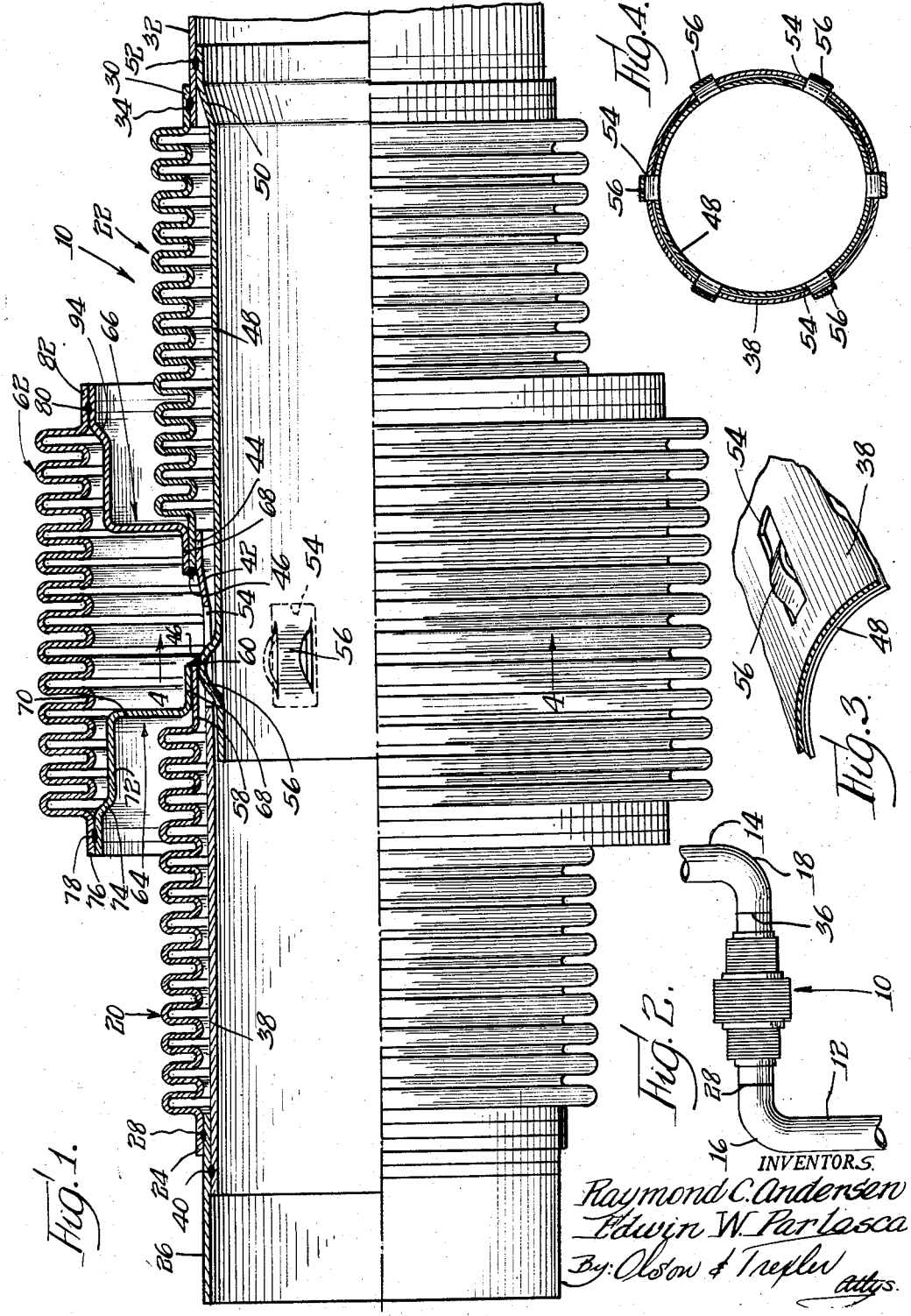

MULTIPLE BELLOWS EXPANSION JOINT WITH LIMIT MEANS

Raymond C. Andersen, Lombard, and Edwin W. Parlasca, Elgin, Ill., assignors to Flexonics Corporation, Maywood, Ill., a corporation of Illinois Application June 18, 1954, Serial No. 437,839

4 Claims. (Cl. 285—228)

The present invention relates to a novel expansion joint or compensator for a fluid conduit system and while it will be apparent that the novel compensator of this invention may be utilized in various installations, it is especially adapted for use in heated air or associated conduit systems of airplanes and the like.

Various expansion compensators have heretofore been suggested but such compensators have not been entirely satisfactory since they are often unduly complicated and expensive to manufacture and since they are often undesirably heavy and bulky, especially for use in aircraft. It is, therefore, an object of the present invention to provide a novel expansion joint or compensator for fluid conduit systems, which compensator is of relatively simple, compact, economical and light weight construction while being efficient in operation and having a long useful life.

More specifically, it is an object of the present invention to provide a novel expansion joint or compensator of the above described type having a plurality of flexible corrugated metal tubes, which joint is constructed so as to protect the metal tubes against impingement by the direct flow of material therethrough regardless of the expanded or flexed condition of the compensator, whereby to prevent injury to the corrugated tubes and to eliminate vibratory impulses in the flowing material or fluid that would be created if the fluid could impinge against the corrugated tubes.

Another object of the present invention is to provide a novel expansion joint or compensator of the above described type which is constructed so as to have a minimum overall length for a given amount of axial expansion and contraction that may be accommodated thereby.

Still another object of this invention is to provide a novel expansion joint or compensator possessing the characteristics mentioned in the preceding paragraphs and also constructed to accommodate, in a controlled manner, relative lateral displacement between the pipes or conduits connected by the compensator.

A further object of the present invention is to provide a novel expansion joint or compensator of the above described type which is constructed so that fluid may flow therethrough easily and without undue turbulence.

Other objects and advantages of the present invention will become apparent from the following description and the accompanying drawings wherein:

Fig. 1 is an elevational view partially in cross section of a novel expansion joint or compensator embodying the features of the present invention;

Fig. 2 is a somewhat diagrammatic view showing the novel compensator of this invention connected in a fluid conduit system;

Fig. 3 is a fragmentary perspective view showing a portion of a novel structure of this invention in greater detail; and Fig. 4 is a cross sectional view taken along line 4—4 in Fig. 1.

Referring now more specifically to the drawings wherein like parts are designated by the same numerals throughout the various figures, a compensator 10 embodying the principles of this invention is especially adapted for use in connecting a pair of conduits 12 and 14 in the manner shown in Fig. 2. As will be understood, the fluid pressure within the conduits acts in opposite directions against the oppositely facing walls of the conduits in the areas indicated by numerals 16 and 18 so that there is a tendency to expand or axially stretch the compensator. As will appear from the description hereinbelow, the compensator is constructed so that this tendency may be partially or completely overcome.

As shown best in Fig. 1, the compensator 10 includes a pair of axially aligned corrugated sheet metal tubes 20 and 22. The corrugated tube 20 is provided at its outer end with a cylindrical flange portion 24 which receives a short pipe section 26 and is connected to the pipe section by a continuous annular weld 28. The pipe section 26 is adapted to be connected to the conduit 12 by means of welding as indicated at 28 in Fig. 2. The outer end of the corrugated tube 22 is similarly provided with a cylindrical flange 30 which is connected to a short pipe section 32 by a continuous annular weld 34. The pipe section 32 is adapted to be connected to a conduit 14 by an annular weld 36 shown in Fig. 2.

In order to connect the tubes 20 and 22 together, a tubular liner or sleeve 38 is disposed within the corrugated tube 20 and is connected to the pipe section 26 by means of an annular weld 40. The outer end of the sleeve 38 is, thus, also operatively connected with the outer end of the flexible corrugated tube 20 through the pipe section 26. The opposite or inner end of the sleeve 20 is slightly flared radially as indicated at 42 so that it fits snugly within a cylindrical flange 44 provided at the inner end of the corrugated tube 22. The inner ends of the sleeve 38 and tube 22 are connected together by means of an annular weld 46. A second sleeve 48 extends through the corrugated tube 22 and also telescopes within the sleeve 38. It should be noted that the diameter of the sleeve 48 is less than the diameter of the sleeve 38 so as to permit the sleeves to be laterally deflected relative to each other. This, of course, also permits the outer ends of the corrugated tubes and the pipe sections connected thereto to be laterally deflected relative to each other. The amount of such lateral deflection may be controlled or limited to a predetermined amount by predetermining the relation between the inner and outer diameters of the corrugated sleeves 38 and 48, respectively, and by predetermining the length or amount of telescoping of the sleeves 38 and 48. Thus, by decreasing the diameter of the sleeve 48 and/or by shortening the telescoping relationship between the sleeves, an increase in the possible amount of lateral deflection between the sleeves is obtained. The outer end of the sleeve 48 is flared outwardly as at 50 for connection with the pipe section 32 by means of an annular weld 52 and the opposite or inner end portion of the sleeve 48 is connected with the inner end of the corrugated tube 20 in the manner described below.

In accordance with the present invention, a portion of the sleeve 38 adjacent to but spaced from its inner terminal end is provided with a plurality of axially extending circumferentially spaced slots 54. In order to connect the inner end of the sleeve 48 to the inner end of the corrugated tube 20, the sleeve 48 is provided with protuberance means 56 extending through each of the slots 54 and welded to a cylindrical inner end flange 58 of the tube 20 as indicated at 60. Each of the protuberance means 56 is in the form of a strap which has been provided by slitting the sleeve 48 along axially extending parallel lines adjacent to but spaced from the inner terminal end of the sleeve. After the slits have been cut, the straps are, of course, deformed radially outwardly as shown best in Figs. 1 and 3 so that they extend through the slots 54 for connection with the corrugated tube 20. With this construction, it should be noted that the fluid conduit through the compensator is provided entirely by the sleeves 38 and 48, which sleeves have smooth surfaces so as to promote smooth flow of fluid therethrough. Since the compensator is normally installed so that fluid flows from right to left as viewed in Fig. 1, the inner terminal end or edge of the sleeve 48 will not impede the flow of fluid. The formation of the straps or protuberances 56 in the sleeve 48 does, of course, provide breaks in the wall of the sleeve, but these breaks are relatively small so that any turbulence created thereby is of no substantial consequence. It should also be noted that the sleeves 38 and 48 completely protect the corrugated tubes against impingement by the direct flow of fluid passing through the compensator. Upon reference to Fig. 1, it will be seen that regardless of the expanded or contracted condition of the compensator, the sleeve 48 closes substantial portions of the slots 54 against the direct flow of fluid and the straps 56 provide baffles for directing fluid passing through the slots along tortuous paths, whereby direct high velocity impingement of the fluid and any particles carried thereby against the corrugated tubes is prevented.

In order to counteract the tendency of the pressure in the fluid system to expand the compensator, means including a corrugated tube 62 is provided. As shown best in Fig. 1, the corrugated tube is disposed so that it is concentric with the tubes 20 and 22 and surrounds and overlaps the inner end portions of the tubes 20 and 22. The opposite ends of the tube 62 are respectively closed by sheet metal closure members 64 and 66. The closure member 64 includes an inner cylindrical portion 68 which is connected to the cylindrical flange 58 of the corrugated tube 20 and to the protuberance means or straps 56 by the above mentioned weld 60. An annular radially extending wall portion 70 of the closure member 64 is integral with the inner cylindrical flange 68 and also joins an outer axially extending cylindrical portion 72. The cylindrical portion 72 is flared outwardly as at 74 for connection with a cylindrical end flange 76 of the corrugated tube 62 by means of a continuous annular weld 78. As shown in Fig. 1, the cross sectional configuration of the closure member 66 is identical to that of the closure member 64 as indicated by the application of identical reference numerals to corresponding elements. The inner end of the closure member 66 is connected to the cylindrical flange 44 of the corrugated tube 22 and to the inner end of the sleeve 38 by means of the above described weld 46. The outer end of the closure member 66 is connected by means of a continuous annular weld 80 to a cylindrical end flange 82 of the corrugated tube 62. With this structure, it is seen that fluid under pressure enters into the chamber provided by the corrugated tube 62 and the end closure members. This pressure acting against the wall 70 of the closure member 64 tends to pull the sleeve 48 toward the left and, thus, collapses the corrugated tube 22 while the pressure acting against the radial wall of the closure member 66 tends to pull the sleeve 38 toward the right and collapses the corrugated tube 20. As will be understood, the diameters of the corrugated tube 62 and its associated end closure members may be formed so that any tendency of the fluid pressure in the system to expand the joint or compensator 10 is either partially or completely overcome, and moreover, these diameters may even be formed so that the net effect of the fluid pressure acting on all parts of the compensator is to cause collapsing or contraction of the compensator. It should be particularly noted that the corrugated tube 62 overlaps the corrugated tubes 20 and 22 and that the particular cross sectional shape of the end closures 64 and 66 enables the inner ends of the tubes 20 and 22 to be positioned close together. Thus, the overall length of the compensator is maintained substantially at a minimum; or in other words, the overall length of the compensator is substantially equal only to the necessary combined lengths of the tubes 20 and 22 without regard to the length of the tube 62.

From the aforementioned description, it is seen that the present invention has provided a novel expansion joint or compensator fully satisfying the objects heretofore set forth. More specifically, it is seen that the present invention has provided a compensator which is of simple, compact and light weight construction. In addition, it is seen that as a result of the novel manner in which the inner ends of the sleeves 38 and 48 are connected with the corrugated tubes 20 and 22 and with the end closure members 64 and 66, the sleeves completely protect the corrugated tubes against the direct flow of the fluid through the compensator and also provide a substantially smooth wall passageway for the fluid passing through the compensator.

While the preferred embodiment of the present invention has been shown and described herein, it is obvious that many structural details may be changed without departing from the spirit and scope of the appended claims.

The invention is claimed as follows:

1. A compensator of the type described comprising first and second corrugated substantially axially aligned tubes disposed with inner ends adjacent each other, a sleeve having a predetermined internal diameter extending through said first tube and interconnected with an outer end portion of said first tube and an inner end portion of said second tube, a second sleeve having an external diameter less than said internal diameter of the first sleeve and extending through said second tube and telescoping into said first sleeve and interconnected with an outer end portion of said second tube, an inner end portion of said first sleeve having a plurality of circumferentially spaced openings therein, an innermost terminal end section of said first sleeve inner end portion being substantially circumferentially continuous and uninterrupted, integral protuberance means deformed from and extending radially outwardly from an inner end portion of said second sleeve through said openings and connected to an inner end portion of said first tube, said second sleeve having a substantially continuous uninterrupted inner terminal end section a third corrugated tube of larger diameter than and substantially concentric with said first and second tubes and having its interior communicating with the interior of said sleeves, a first end closure connected with one end of said third tube and also interconnected with said protuberance means, and a second end closure connected with the opposite end of said third tube and also connected with the inner end portion of said first sleeve.

2. A compensator, as defined in claim 1, wherein said third tube surrounds inner ends of said first and second tubes and has its opposite ends respectively spaced axially outwardly of the inner ends of said first and second tubes, and said end closures respectively extending from the ends of said third tube axially inwardly to inner end portions of said first and second tubes.

3. A compensator, as defined in claim 1, wherein said protuberance means are in the form of elongated integral radially outwardly deformed strap sections of said second sleeve, which sections are of less axial extent than said openings.

4. A compensator, as defined in claim 1, wherein all of the connections between said sleeves and said first and second corrugated tubes, between said protuberance means and said first tube, between said third tube and said end closures, between said first end closure and said protuberance means and between said second end closure and said first sleeve are provided by welds.

(References on following page)

References Cited in the file of this patent

UNITED STATES PATENTS

| | | |
|---|---|---|
| 2,207,146 | Fentress et al. | July 9, 1940 |
| 2,479,104 | Dreyer | Aug. 16, 1949 |
| 2,712,456 | McCreery | July 5, 1955 |

FOREIGN PATENTS

| | | |
|---|---|---|
| 725,839 | France | Feb. 16, 1932 |
| 100,253 | Sweden | Nov. 12, 1940 |
| 215,472 | Switzerland | Oct. 1, 1941 |
| 262,367 | Switzerland | Oct. 1, 1949 |